(12) United States Patent
Spanks et al.

(10) Patent No.: US 8,756,831 B2
(45) Date of Patent: Jun. 24, 2014

(54) ARTICLE OF FOOTWEAR

(71) Applicant: Nike, Inc., Beaverton, OR (US)

(72) Inventors: Jeffrey C. Spanks, Portland, OR (US); Thomas Foxen, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 13/647,760

(22) Filed: Oct. 9, 2012

(65) Prior Publication Data

US 2013/0031811 A1    Feb. 7, 2013

Related U.S. Application Data

(62) Division of application No. 11/853,653, filed on Sep. 11, 2007, now Pat. No. 8,302,233.

(51) Int. Cl.
A43B 9/12      (2006.01)
A43B 13/32    (2006.01)
A43B 13/12    (2006.01)

(52) U.S. Cl.
USPC .................. 36/19.5; 36/30 R; 36/107

(58) Field of Classification Search
USPC ........ 36/12, 19.5, 30 R, 107; 12/142 F, 142 T
See application file for complete search history.

(56) References Cited

U.S. PATENT DOCUMENTS

| 2,037,105 A | 4/1936 | West |
| 2,323,562 A | 7/1943 | Nugent |
| 2,419,387 A | 4/1947 | Bierer |
| 2,865,097 A | 12/1958 | Vollrath, Jr. et al. |
| 2,985,970 A | 5/1961 | McCarthy |
| 3,052,904 A | 9/1962 | Reid et al. |
| 4,347,673 A | 9/1982 | Svetlik |
| 4,434,518 A | 3/1984 | Watanabe |
| 4,510,700 A * | 4/1985 | Brown ............................. 36/44 |
| 4,697,362 A | 10/1987 | Wasserman |
| 4,712,314 A | 12/1987 | Sigoloff |
| 4,854,057 A * | 8/1989 | Misevich et al. ............... 36/114 |
| 4,896,440 A | 1/1990 | Salaverria |
| 5,084,988 A | 2/1992 | Berger |
| 5,203,793 A | 4/1993 | Lyden |
| 5,212,878 A | 5/1993 | Burke et al. |
| 5,224,278 A | 7/1993 | Jeon |
| 5,315,769 A * | 5/1994 | Barry et al. ..................... 36/114 |
| 5,528,842 A | 6/1996 | Ricci et al. |

(Continued)

FOREIGN PATENT DOCUMENTS

| CN | 1249668 | 4/2000 |
| CN | 101385584 | 8/2000 |
| EP | 1048233 | 2/2000 |

OTHER PUBLICATIONS

International Search Report and Written Opinion, mailed Aug. 11, 2008, from PCT Application No. PCT/US2008/056823.

(Continued)

Primary Examiner — Khoa Huynh
Assistant Examiner — Sharon M Prange
(74) Attorney, Agent, or Firm — Plumsea Law Group, LLC

(57) ABSTRACT

A method of making a sole for an article of footwear is disclosed. The method includes steps of attaching a double sided acrylic adhesive film to a composite plate. The composite plate is then attached to an outer member of the article of footwear using the acrylic adhesive film.

27 Claims, 11 Drawing Sheets

(56) References Cited

U.S. PATENT DOCUMENTS

| | | | |
|---|---|---|---|
| 5,529,826 A | 6/1996 | Tailor et al. | |
| 5,544,431 A | 8/1996 | Dixon | |
| 5,649,374 A | 7/1997 | Chou | |
| 5,659,979 A | 8/1997 | Sileo | |
| 5,832,634 A | 11/1998 | Wong | |
| 5,894,683 A | 4/1999 | Lin | |
| 5,983,527 A | 11/1999 | Strickland et al. | |
| 6,012,822 A | 1/2000 | Robinson | |
| 6,098,313 A | 8/2000 | Skaja | |
| 6,574,886 B1 * | 6/2003 | Issler | 36/12 |
| 6,622,401 B2 | 9/2003 | Carroll, III | |
| 6,711,836 B2 | 3/2004 | Weiss | |
| 6,751,891 B2 | 6/2004 | Lombardino | |
| 6,775,930 B2 | 8/2004 | Fuerst | |
| 6,964,120 B2 | 11/2005 | Cartier et al. | |
| 7,003,900 B2 | 2/2006 | Trommer | |
| 7,082,698 B2 | 8/2006 | Smaldone et al. | |
| 7,082,702 B2 | 8/2006 | Cretinon | |
| 7,159,338 B2 | 1/2007 | LeVert et al. | |
| 7,178,268 B2 | 2/2007 | Trommer | |
| 7,370,443 B2 | 5/2008 | Gibert et al. | |
| 7,395,617 B2 | 7/2008 | Christensen et al. | |
| 7,401,422 B1 | 7/2008 | Scholz et al. | |
| 7,744,513 B2 * | 6/2010 | Castellano | 482/139 |
| 2002/0088143 A1 | 7/2002 | Brooks et al. | |
| 2003/0110661 A1 | 6/2003 | Wu | |
| 2004/0111920 A1 | 6/2004 | Cretinon | |
| 2005/0120592 A1 | 6/2005 | Rodriguez | |
| 2005/0274043 A1 | 12/2005 | DeSaix | |
| 2006/0137219 A1 * | 6/2006 | Xavier et al. | 36/25 R |
| 2006/0174521 A1 | 8/2006 | Lee | |
| 2006/0277797 A1 | 12/2006 | McLinden | |
| 2006/0283044 A1 | 12/2006 | Lacey | |
| 2007/0017122 A1 | 1/2007 | Feller et al. | |
| 2007/0068039 A1 | 3/2007 | Nau | |
| 2007/0101617 A1 | 5/2007 | Brewer et al. | |
| 2009/0064535 A1 | 3/2009 | Spanks et al. | |

OTHER PUBLICATIONS

International Preliminary Report on Patentability mailed Mar. 25, 2010 from PCT Application No. PCT/US2008/056823.
Chinese Office Action mailed Aug. 5, 2010 in Chinese Application No. 200810215524.7 and English translation thereof.
Chinese Office Action mailed Jan. 26, 2011 in Chinese Application No. 200810215524.7 and English translation thereof.
Chinese Office Action mailed Aug. 9, 2011 in Chinese Application No. 200810215524.7 and English translation thereof.
Chinese Office Action mailed Nov. 2, 2011 in Chinese Application No. 200810215524.7 and English translation thereof.
Extended European Search Report dated Sep. 30, 2013 in European Patent Application No. EP08732114.7.
Response to Extended European Search Report filed Mar. 14, 2014 in European Patent Application No. EP08732114.7.

* cited by examiner

ARTICLE OF FOOTWEAR

This application is a divisional of Spanks, et al., U.S. Patent Publication Number US2009/0064535, published Mar. 12, 2009, which is herein incorporated by reference in its entirety.

BACKGROUND OF THE INVENTION

1. Field of the Invention

The present invention relates generally to footwear and in particular to a method of making an article of footwear.

2. Description of Related Art

Methods of making soles have been previously proposed. Brewer et al. (U.S. Patent Publication Number 2007/0101617) teaches a footwear sole assembly having a spring mechanism. The Brewer design includes an upper plate made of TPU and a lower plate made of a reinforced material such as a carbon fiber or KEVLAR, for example. Brewer teaches that the upper plate and lower plate may be attached by any of various methods, such as, adhesive, heat bonding, ultrasonic welding or mechanical connection.

McLinden (U.S. Patent Publication Number 2006/0277797) teaches an absorbent footwear liner. McLinden teaches a liner comprising an upper absorbent layer and a lower layer comprising an adhesive material. McLinden teaches the use of an acrylic adhesive. In particular, McLinden teaches that the lower layer comprises a double-sided adhesive film such as double-faced acrylic pressure sensitive adhesive tape with release liner. McLinden does not teach the use of the adhesive with a carbon fiber plate or any substantially rigid material for a portion of a sole. Instead, the adhesive is used to attach the footwear liner to the article of footwear, at the sole, for example.

SUMMARY OF THE INVENTION

A method of making an article of footwear and an apparatus are disclosed. In one aspect, the invention provides a method of making a sole for an article of footwear, comprising the steps of: applying a first side of an adhesive film to a bottom portion of a composite plate; associating a second side of the adhesive film with an inner portion of an outer member; and thereby fixedly attaching the composite plate to the outer member.

In another aspect, the adhesive film includes a protective layer.

In another aspect, the step of associating the adhesive film with the inner portion of the outer member further comprises the step of removing the protective layer after the adhesive film has been applied to the bottom portion of the composite plate.

In another aspect, a first adhesive film is applied to a top portion of the composite plate and a second adhesive film is applied to the bottom portion of the composite plate.

In another aspect, the first adhesive film is associated with a lower portion of a midsole and the second adhesive film is associated with the inner portion of the outer member.

In another aspect, the outer member is substantially transparent.

In another aspect, an indicia is applied to the inner portion of the outer member.

In another aspect, the indicia is visible through an outer portion of the outer member.

In another aspect, the indicia is applied to a side wall portion of the outer member.

In another aspect, the invention provides a method of making a sole for an article of footwear, comprising the steps of: applying an adhesive film to a top portion of a composite plate; associating the adhesive film with a lower portion of a midsole; applying the adhesive film to the lower portion; and thereby fixedly attaching the composite plate to the midsole.

In another aspect, the sole includes an outer member.

In another aspect, a first adhesive film is applied to a top portion of a composite plate and a second adhesive film is applied to a bottom portion of a composite plate.

In another aspect, the composite plate is fixedly attached to the outer member via the second adhesive film and the composite plate is fixedly attached to the midsole via the first adhesive film.

In another aspect, an indicia is applied to an inner portion of the outer member and wherein the indicia is visible through an outer portion of the outer member that is disposed opposite of the inner portion.

In another aspect, the invention provides an article of footwear, comprising: a sole including an outer member and a composite plate; an adhesive film disposed between the outer member and the composite plate including a first side and a second side; and where the first side of the adhesive film is fixedly attached to a bottom portion of the composite plate and where the second side of the adhesive film is fixedly attached to an inner portion of the outer member.

In another aspect, the sole includes a midsole.

In another aspect, a first adhesive film is attached to a top portion of the composite plate and a second adhesive film is attached to the bottom portion of the composite plate.

In another aspect, the first adhesive film is associated with a midsole.

In another aspect, the second adhesive film is associated with the outer member.

In another aspect, an indicia is disposed on the inner portion of the outer member and where the indicia is visible through an outer portion of the outer member.

Other systems, methods, features and advantages of the invention will be, or will become apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
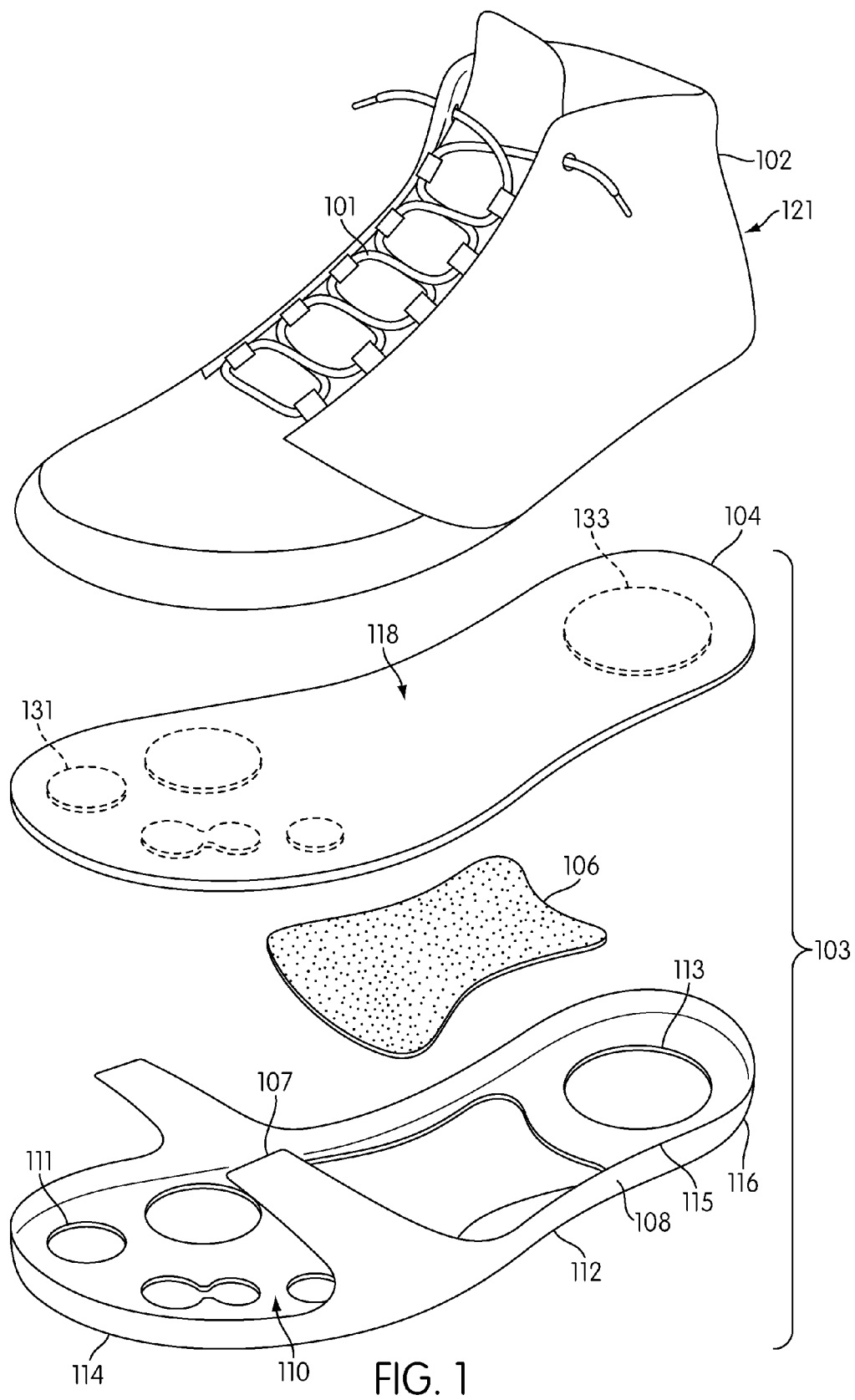
FIG. 1 is an exploded view of a preferred embodiment of an article of footwear.

FIG. 1 is an isometric exploded view of a preferred embodiment of article of footwear 100. In a preferred embodiment, article of footwear 100 may be a basketball shoe. For clarity, the following detailed description discusses a preferred embodiment; however, it should be kept in mind that the present invention could also take the form of any other kind of footwear including, for example, soccer shoes, running shoes, football cleats, boots, as well as other kinds of footwear. As shown throughout the figures, article of footwear 100 is intended to be used with a left foot, however it should be understood that the following discussion may equally apply to a mirror image of article of footwear 100 that is intended for use with a right foot.

Article of footwear 100 may include upper 102. The current embodiment includes a preferred design for upper 102. In other embodiments, the design of upper 102 may be modified. Generally, any design for upper 102 may be used.

Article of footwear 100 may include a fastening system of some kind that is configured to adjustably tighten upper 102 around a foot. In some embodiments, article of footwear 100 includes lacing system 101. In other embodiments, article of footwear 100 may include a different kind of fastening system. Examples of other types of fastening systems include, but are not limited to zippers, straps, buttons, as well as other types of fasteners.

In some embodiments, upper 102 may be associated with sole 103. In some cases, sole 103 could include midsole 104 that is configured to provide support for a foot. In other cases, sole 103 could include outer member 108 that is configured to provide durability and protect the foot from the ground. In still other cases, sole 103 could include an insole in order to provide padding between the foot and midsole 104 or outer member 108. In a preferred embodiment, sole 103 includes both midsole 104 and outer member 108. With this preferred arrangement, sole 103 may provide increased support for the foot during walking, running or various athletic activities.

In some embodiments, midsole 104 may be disposed between upper 104 and outer member 108. In this embodiment, upper side 118 of midsole 104 is generally flat. In some embodiments, lower side 119 of midsole 104 may include front raised portions 131 and rear raised portion 133. In a preferred embodiment, raised portions 131 and 133 may extend below lower side 119.

As previously discussed, sole 103 includes outer member 108. In some embodiments, outer member 108 may include raised side walls 115. With this arrangement, sole 103 is configured as a wrap-around sole. Additionally, in some embodiments, outer member 108 may include forefoot holes 111 that are configured to receive front raised portions 131. In some cases, outer member 108 may also include rear hole 113 that is configured to receive rear raised portion 133. With this configuration, portions 131 and 133 of midsole 104 may be disposed below outer member 108 following the assembly of sole 103. This preferred arrangement may help with shock resistance.

In some embodiments, outer member 108 may also include extended portions 107. In the current embodiment, extended portions 107 are fin-like in shape. In some cases, extended portions 107 may be disposed at forefoot region 114. In a preferred embodiment, extended portions 107 may be configured to engage an inner surface of upper 102. Using this configuration, forward portion 121 of upper 102 may be structurally reinforced and may resist bending. In another embodiment, extended portions 107 could be used in conjunction with a heel counter to provide added support for the heel.

Article of footwear 100 may include provisions for reinforcing outer member 108. In some embodiments, outer member 108 may be associated with composite plate 106. The term "composite plate" may refer to any component used for reinforcing a sole that is both lightweight and structurally rigid in at least one dimension of the sole.

Each of the components discussed here, including upper 102, midsole 104, composite plate 106 and outer member 108, may be constructed using materials known in the art. Upper 102 may be made from any material that is suitable for use as an upper. Examples of suitable materials include, but are not limited to, nylon, natural leather, synthetic leather, natural rubber, or synthetic rubber, as well as other materials. In a preferred embodiment, upper 102 may be made of synthetic leather.

In some embodiments, midsole 104 may be made of a deformable material. In some cases, midsole 104 may be made of a soft foam material configured to deflect in the vertical direction. In other cases, midsole 104 may be made of a hard foam material configured to provide additional support to the foot. Examples of other suitable materials for midsole 104 include, but are not limited to, EVA foam, elastomers, TPU, phylon, plastics as well as other substantially deforming materials.

Generally, outer member 108 may be made from any suitable outer-sole material. Examples of suitable materials include, but are not limited to, elastomers, siloxanes, natural rubber, other synthetic rubbers, aluminum, steel, natural leather, synthetic leather, or plastics. In this preferred embodiment, outer member 108 is made of a durable plastic.

In some embodiments, composite plate 106 may be a carbon fiber composite plate. In some cases, composite plate 106 may comprise pre-peg woven sheets of carbon fibers. In other cases, composite plate 106 may comprise thermoplastic materials as well. In this preferred embodiment, composite plate 106 may be a carbon fiber composite plate comprising stacked layers of thermoplastic urethane and pre-peg woven sheets of carbon fibers.

Preferably, composite plate 106 is configured to attach to inner portion 110 of outer member 108. In some embodiments, composite plate 106 is configured to attach to inner portion 110 at arch region 112. In other embodiments, composite plate 106 may attach to inner portion 110 at other regions, including forefoot region 114 and heel region 116. In an alternative embodiment, composite plate 106 may be a full length composite plate, configured to cover regions 112, 114 and 116 simultaneously. Examples of full length composite plates may be found in U.S. Pat. No. 7,832,117, issued Nov. 16, 2010 (U.S. application Ser. No. 11/458,044, filed Jul. 17, 2006), the entirety of which is hereby incorporated by reference.

Preferably, once composite plate 106 has been attached to outer member 108, sole 103 may be assembled. At this point, midsole 104 may be attached to outer member 108 using an adhesive of some kind. Using this configuration, composite plate 106 may be disposed between midsole 104 and outer member 108. Following this, sole 103 may be attached to upper 102 at upper side 118 of midsole 104.

Figure 2:
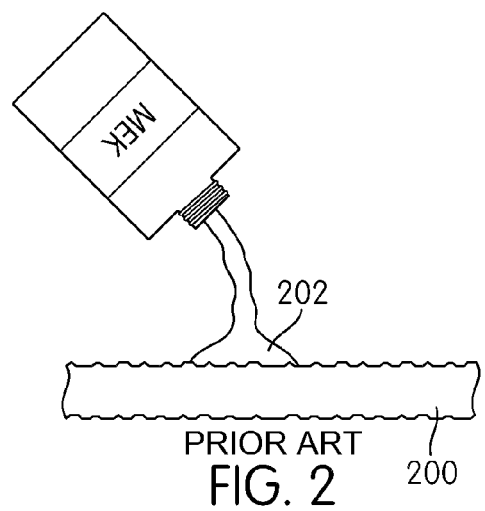
FIG. 2 is a schematic view of an embodiment of a step of cleaning a composite plate according to the prior art.
Figure 3:
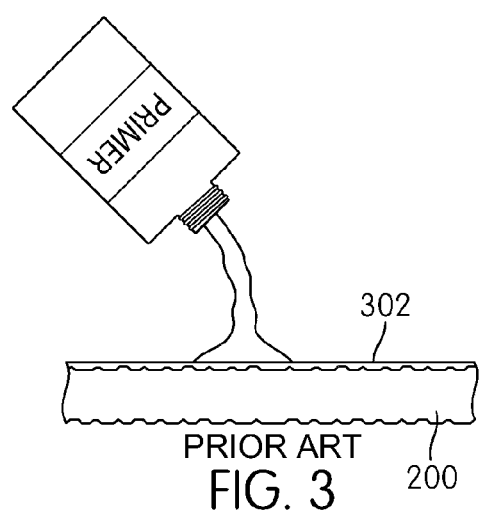
FIG. 3 is a schematic view of an embodiment of a step of applying a primer to a composite plate according to the prior art.
Figure 4:
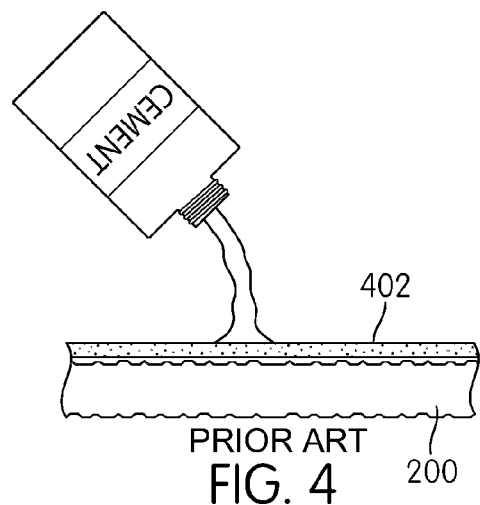
FIG. 4 is a schematic view of an embodiment of a step of applying cement to a composite plate according to the prior art.
Figure 5:
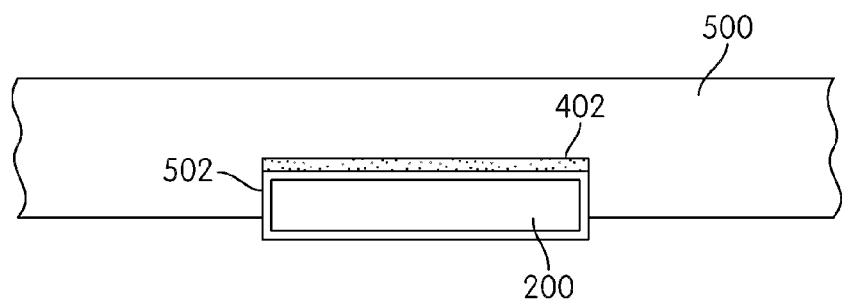
FIG. 5 is a schematic view of an embodiment of a step of attaching a composite plate to a sole according to the prior art.

Referring to FIGS. 2-5, previous methods for attaching a composite plate to one or more components of a sole have used a complex, costly and environmentally destructive multi-step process. During a first step, as seen in FIG. 2, solvent based cleaner 202 is applied to composite plate 200 to chemically clean composite plate 200. In some cases, a Methyl Ethyl Keytone (MEK) solvent based cleaner is used. During a second step, seen in FIG. 3, primer layer 302 is added to composite plate 200 to prepare surface 304 for an adhesive. During a third step, shown in FIG. 4, cement layer 402 is applied to composite plate 200. At this point, as shown in FIG. 5, cement layer 402 is used to bond the composite plate 200 to sole 500. In some cases, sole 500 may include recessed portion 502 configured to receive composite plate 200.

As previously mentioned, this traditional process for attaching a composite plate to a sole is time consuming and costly. Preferably, a method for attaching a composite plate to a sole includes provisions for using environmentally friendly materials as well as provisions for minimizing the number of steps involved in the process to improve efficiency. In a preferred embodiment, a double sided acrylic adhesive film may be used to attach a composite plate to a component of a sole in order to simplify the attachment process and substantially reduce costs of the attachment process.

FIGS. 6-15 illustrate a preferred embodiment of a method for attaching a composite plate to one or more components of a sole. These steps are preferably performed at the time of manufacturing an article of footwear. It should be understood that some of the following steps are optional. In some cases, a composite plate may be associated with an outer member. In other cases, a composite plate may be associated with a midsole. In a preferred embodiment, a composite plate may be associated with a sole comprising an outer member and a midsole. Furthermore, the following steps are illustrated with respect to a particular embodiment of a composite plate, however it should be understood that in other embodiments a similar process could be used to attach different types of composite plates to the outer member, midsole or another component of the sole.

Figure 6:
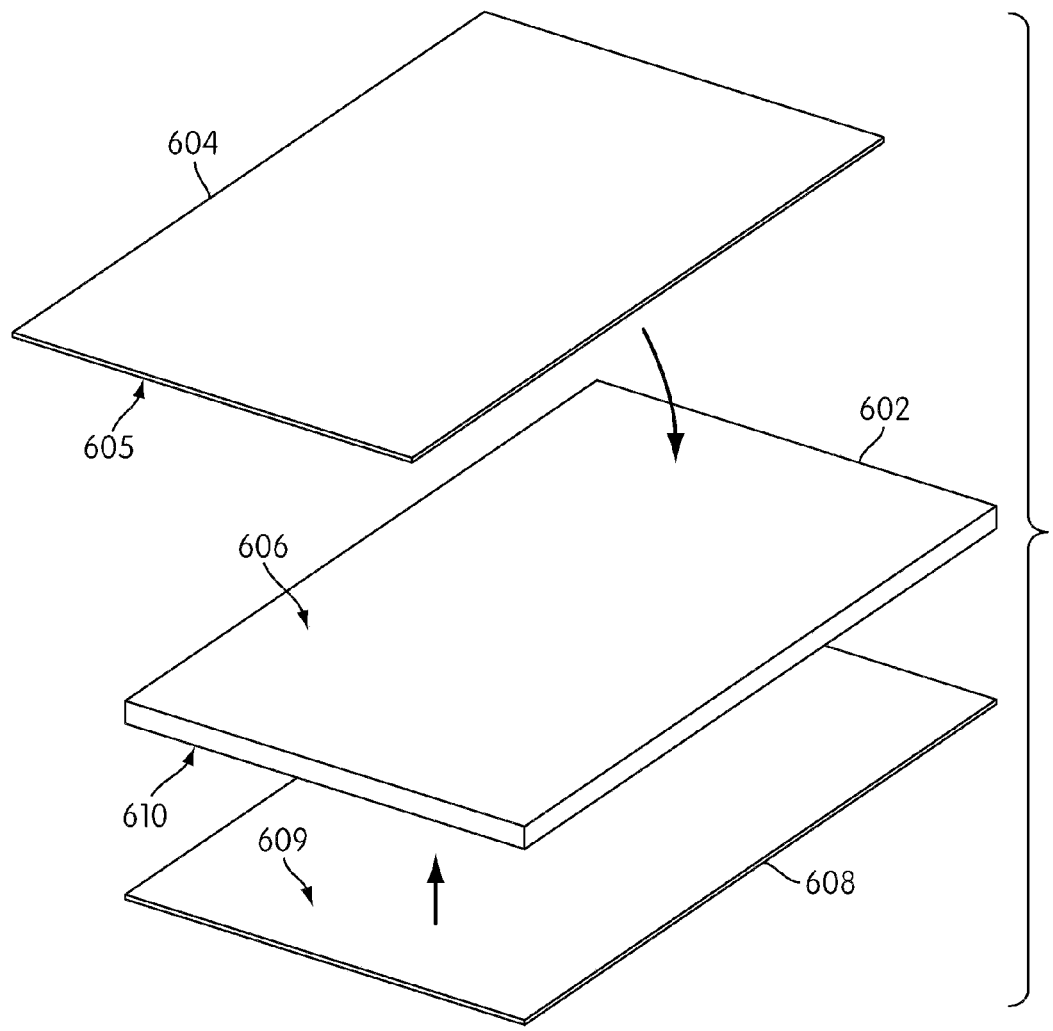
FIG. 6 is a schematic view of a preferred embodiment of a step of associating a composite plate with one or more adhesive films.

FIG. 6 is intended to illustrate a preferred embodiment of a first step in the process for attaching a composite plate to one or more components of a sole. In some cases, prior to forming a composite plate, a composite material may be manufactured in the form of a composite sheet. The term "composite sheet", as used throughout this detailed description and in the claims, refers to any composite material that can be cut or otherwise manipulated to create a composite plate. For example, a composite sheet could comprise a sheet-like layer of carbon fibers that may be cut into a carbon fiber plate at a later time.

During this first step, a composite sheet may be associated with one or more adhesive films. In some cases, an adhesive film may be applied to a top portion of the composite sheet. In other cases, an adhesive film may be applied to a bottom portion of the composite sheet. In a preferred embodiment, adhesive films may be applied to both portions of the composite sheet.

Generally, any type of adhesive film may be used. In some embodiments, a double sided adhesive film may be used. In other embodiments, an acrylic based adhesive film may be used. In a preferred embodiment, a double sided acrylic based adhesive film may be used.

In this embodiment, composite sheet 602 is associated with first adhesive film 604 at top portion 606. In particular, first side 605 of first adhesive film 604 is applied to top portion 606. Likewise, composite sheet 602 is associated with second adhesive film 608 at bottom portion 610. In particular, first side 609 of second adhesive film 608 is applied to bottom portion 610.

Although the current embodiment includes two adhesive films, in other embodiments, a different number of adhesive films could be used. In some cases, multiple adhesive films could be applied to the top portion and the bottom portion of the composite sheet. These adhesive films could overlap, or could be non-overlapping. In still other embodiments, one or more adhesive films could be applied to the outer edges of the composite sheet.

Figure 7:
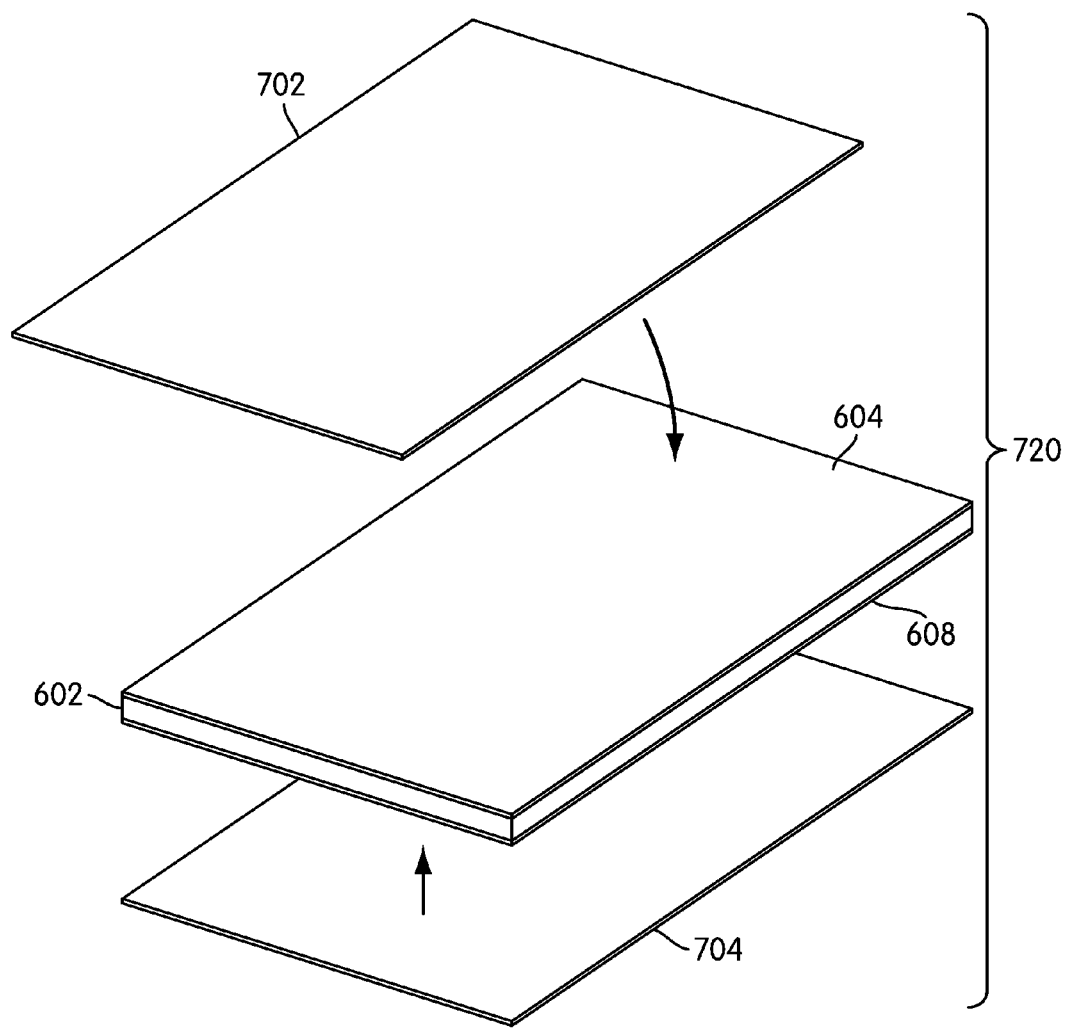
FIG. 7 is a schematic view of a preferred embodiment of a step of associating each adhesive film with a protective layer.

During a second step in this process, seen in FIG. 7, each adhesive film may be further associated with a protective layer. In some embodiments, the protective layers could be layers of plastic. In some cases, the protective layers could be layers of plastic with low coefficients of friction. In a preferred embodiment, the protective layers are layers of Teflon, which has an extremely low coefficient of friction. This preferred arrangement helps to prevent the protective layers from sticking to the adhesive films, respectively, so that the protective layers may be removed from the adhesive films at a later time.

In this embodiment, following the application of adhesive films 604 and 608 to composite sheet 602, first protective layer 702 may be associated with first adhesive film 604. Also, second protective layer 704 may be associated with second adhesive film 608. Using this arrangement, protective layers 702 and 704 may prevent adhesive films 604 and 608 from sticking to other objects during the manufacturing process. Furthermore, protective layers 702 and 704 may protect adhesive films 604 and 608 from collecting dust and debris that may reduce the bonding ability, or the stickiness, of adhesive films 604 and 608.

Generally, composite sheet 602, first adhesive film 604, second adhesive film 608, first protective layer 702 and second protective layer 704 may comprise laminate 720. It should be understood that the thicknesses of adhesive films 604 and 608 as well as the thicknesses of protective layers 702 and 704 are exaggerated in this embodiment for purposes of clarity. In some embodiments, adhesive films 604 and 608 and protective layers 702 and 704 may not be visible once they have been applied to composite sheet 602.

Preferably, adhesive films 604 and 608 may be bonded to composite sheet 602. In some cases, this bonding may be achieved by using pressure. In other cases, this bonding may be achieved by using heat. In a preferred embodiment, this bonding may be achieved by applying both pressure and heat.

Figure 8:
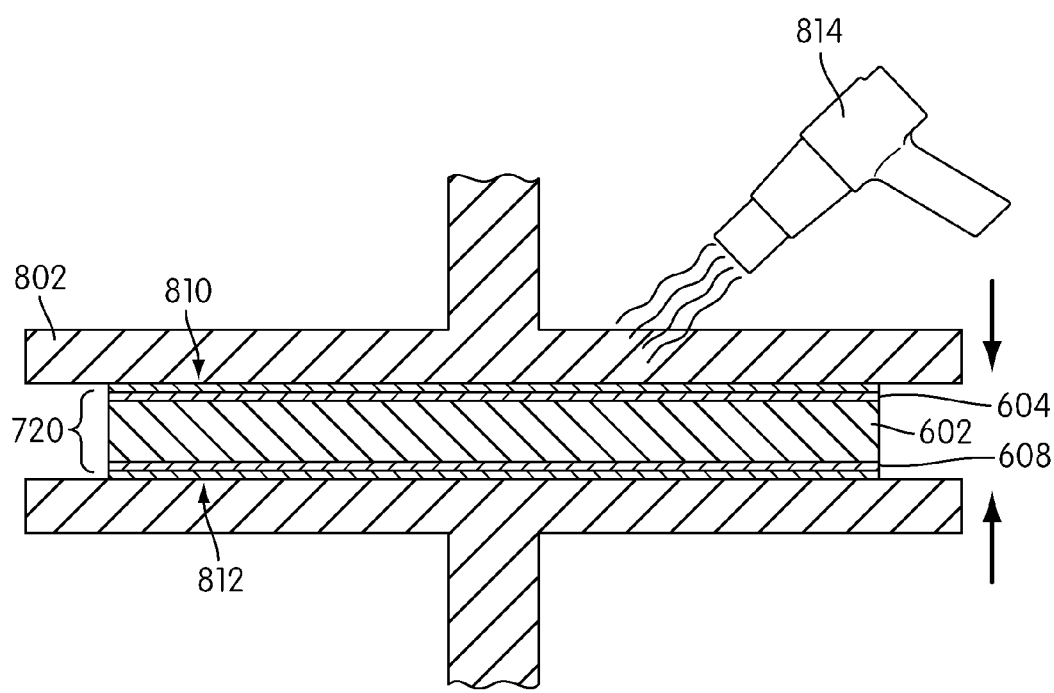
FIG. 8 is a schematic view of a preferred embodiment of a step of bonding adhesive films to a composite sheet using a press.

Referring to FIG. 8, during a third step, adhesive films 604 and 608 may be bonded to composite sheet 602 using press 802. Preferably, press 802 is configured to apply pressure to laminate 720 at first side 810 and second side 812. Additionally, in this preferred embodiment, heat may be applied to laminate 720 using industrial heat gun 814. In some cases, industrial heat gun 814 may be used to heat press 802 while laminate 720 is disposed within press 802. In other cases, industrial heat gun 814 may be applied to laminate 720 before or after laminate 720 is placed within press 802. Using this arrangement, adhesive films 604 and 608 may be bonded to composite sheet 602. Furthermore, by using protective layers 702 and 704, adhesive films 604 and 608 may be prevented from sticking to, and bonding with, press 802.

Figure 9:
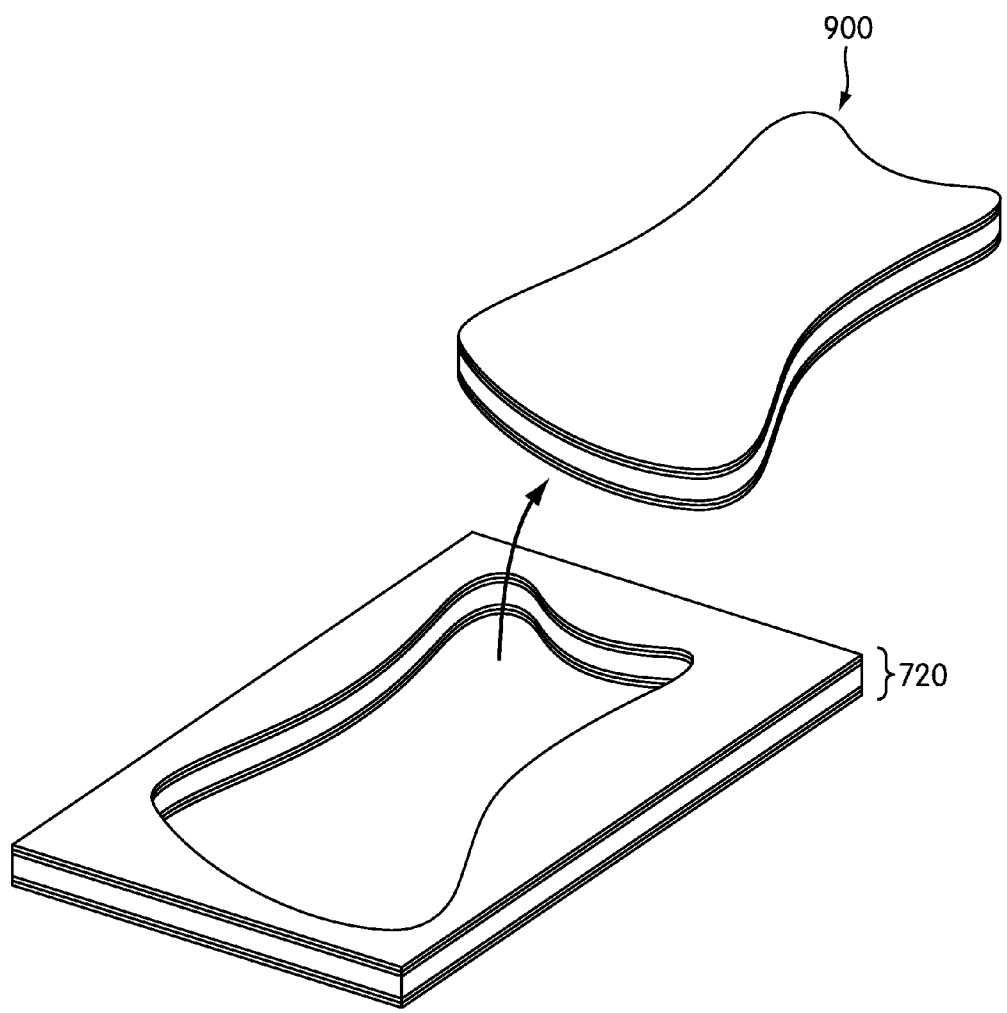
FIG. 9 is a schematic view of a preferred embodiment of a step of cutting a laminate.

Referring to FIG. 9, during a fourth step, laminate 720 may be cut into a plate-like shape. In some embodiments, laminate 720 may be cut using known methods in the art for cutting through composite materials. Examples of methods for cutting composite materials include, but are not limited to, sawing, drilling, laser cutting or other methods of cutting composite materials. In this preferred embodiment, composite plate 900 may be stamped from laminate 720 using a die with a predetermined shape.

Although the current embodiment includes methods of manufacturing a single composite plate, in other embodiments, more than one composite plate can be manufactured from a single composite sheet. For example, in some other embodiments a large composite sheet may be used for making multiple composite plates. Following the formation of a single laminate, including adhesive layers and protective layers, multiple composite plates could be cut from the same laminate. Such provisions could reduce the manufacturing time for producing composite plates. Additionally, these provisions could be used to reduce waste material by cutting multiple composite plates from a single laminate.

Figure 10:
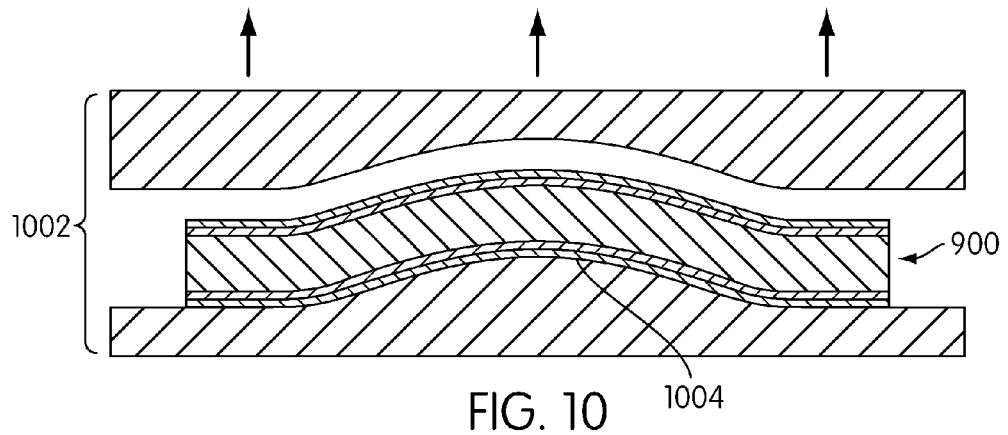
FIG. 10 is a schematic view of a preferred embodiment of a step of reforming a composite plate into a contour shape.

During a fifth step, composite plate 900 may be reformed into a contoured shape, as seen in FIG. 10. In this current embodiment, composite plate 900 may be placed within press 1002. In a preferred embodiment, press 1002 also includes bending die 1004. As composite plate 900 is pressed against bending die 1004, composite plate 900 preferably takes on an arch-like shape. This shape is preferable for a composite plate that may be associated with an arch portion of an article of footwear.

In the current embodiment, composite plate 900 is cut and bent during two different steps. In other embodiments, however, a composite plate may be cut and bent, or otherwise reshaped, during the same step. In these cases, a single press could be used to cut and bend the composite plate simultaneously. In still other embodiments, the composite plate could be bent first and then cut.

Although the current embodiment includes provisions for bending a composite plate into an arch-like shape, in other embodiments a composite plate could be bent, or otherwise reshaped, into different shapes as well. Generally, a composite plate may be bent into any shape using a press with different types of bending dies. In still other embodiments, a composite plate could be bent using other tools as well.

Figure 11:
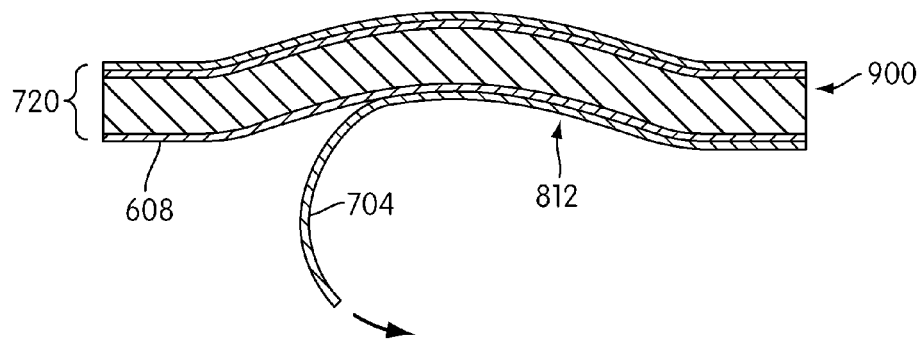
FIG. 11 is a schematic view of a preferred embodiment of a step of peeling a protective layer away from a laminate.

During a sixth step, prior to associating composite plate 900 with one or more components of a sole, one or more protective layers may be removed, as seen in FIG. 11. In this embodiment, second protective layer 704 may be peeled away from second side 812 of laminate 720. Once second protective layer 704 has been removed, second adhesive film 608 may be exposed at second side 812. With this arrangement, second adhesive film 608 may be configured to attach to a component of the sole.

Preferably, a composite plate may be associated with an outer member once the protective layer has been removed from a lower portion of the composite plate. In some embodiments, the composite plate may be associated with a preformed outer member. In other embodiments, the composite plate may be associated with a mold that is used to make an outer member. In a preferred embodiment, the composite plate may be associated with an injection mold.

Figure 12:
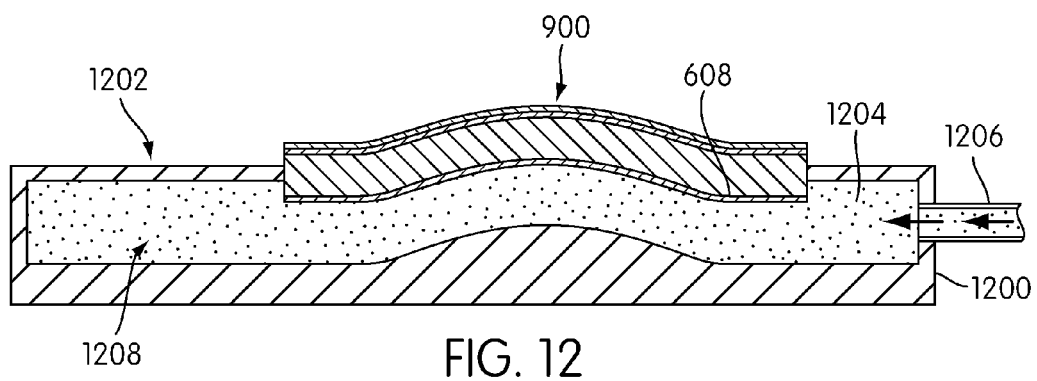
FIG. 12 is a cross sectional view of a preferred embodiment of a step of associating a composite plate with an injection mold.

During a seventh step, seen in FIG. 12, composite plate 900 may be associated with injection mold 1200. In this embodiment, composite plate 900 may be associated with top side 1202 of injection mold 1200. As molding 1204 is injected at intake port 1206, cavity 1208 may be filled. As cavity 1208 is filled, molding 1204 may be disposed against second adhesive film 608. In a preferred embodiment, as molding 1204 is cooled and hardens, molding 1204 may bond with second adhesive film 608.

Figure 13:
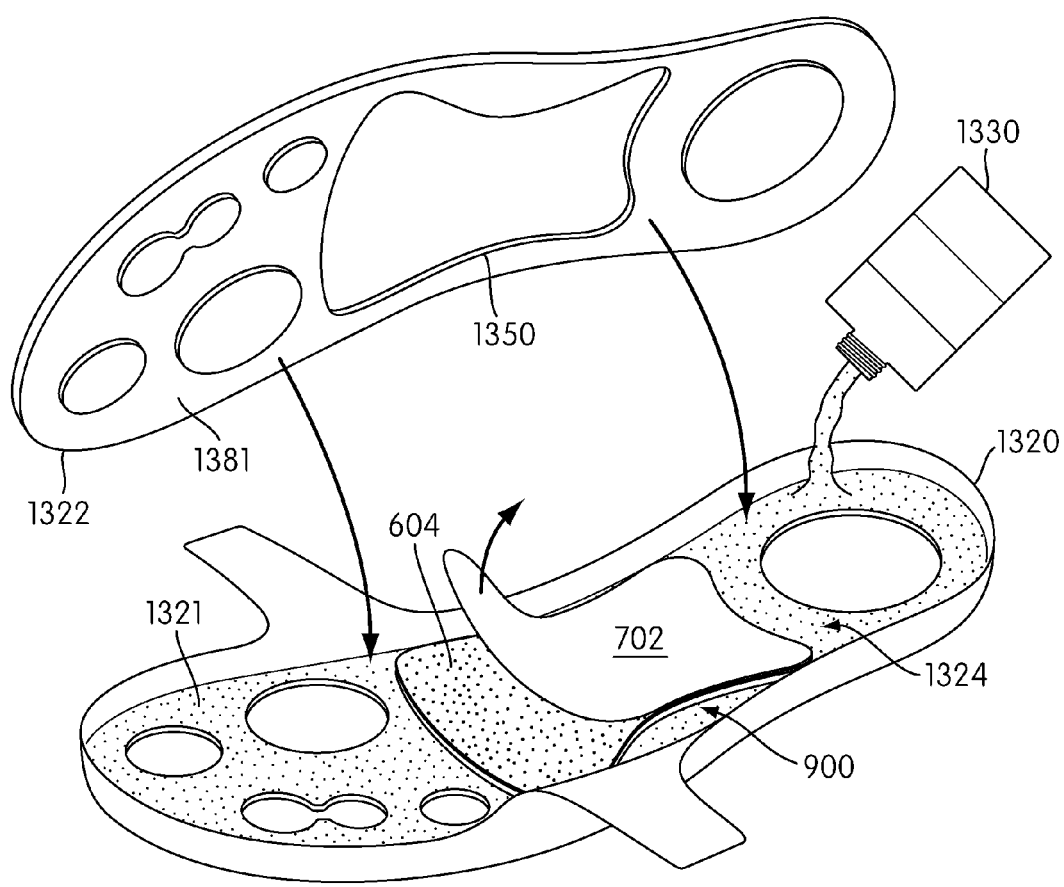
FIG. 13 is a schematic view of a preferred embodiment of a step of associating a composite plate with an outer member and a midsole.

At this point, molding 1204 has hardened to form outer member 1320, as seen in FIG. 13. As seen in this Figure, composite plate 900 has been partially embedded within, and fixedly attached to, outer member 1320. In this embodiment, composite plate 900 may slightly raised with respect inner portion 1324 of outer member 1320. In other embodiments, composite plate 900 may be substantially flush with respect to inner portion 1324.

During an eighth step, outer member 1320 may be associated with, and applied to, lower portion 1381 of midsole 1322. In some embodiments, first protective layer 702 may be removed from composite plate 900. This allows first adhesive film 604 to be exposed. Additionally, inner portion 1324 of outer member 1320 may be prepared to attach to midsole 1322. In some cases, adhesive 1330 may be applied to inner portion 1324, forming adhesive layer 1321. In other cases, a solvent and/or primer may also be applied to inner portion 1324 prior to applying an adhesive.

It should be understood that during this step, solvents, primers and/or adhesives may be applied to composite plate 900 as well. However, these additional provisions are not necessary to fixedly attach composite plate 900 to midsole 1322. Instead, first adhesive film 604 is configured to bond composite plate 900 to midsole 1322 without the use of any other additional provisions.

In some embodiments, a midsole may include provisions for receiving a composite plate. In the current embodiment, midsole 1322 may include recess 1350. In a preferred embodiment, recess 1350 is shaped like, and configured to receive, a portion of composite plate 900 that may be disposed above inner portion 1324.

Figure 14:
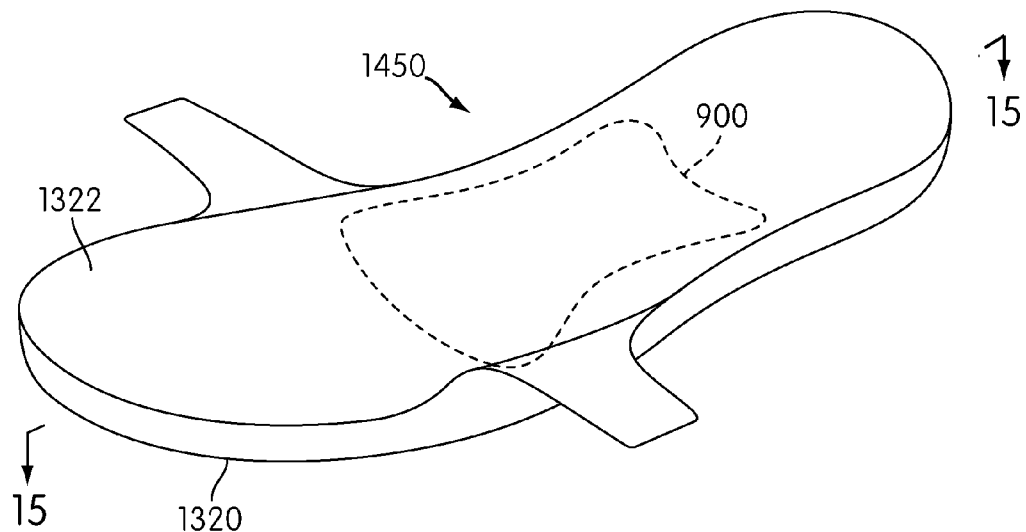
FIG. 14 is a schematic view of a preferred embodiment of an assembled sole.
Figure 15:
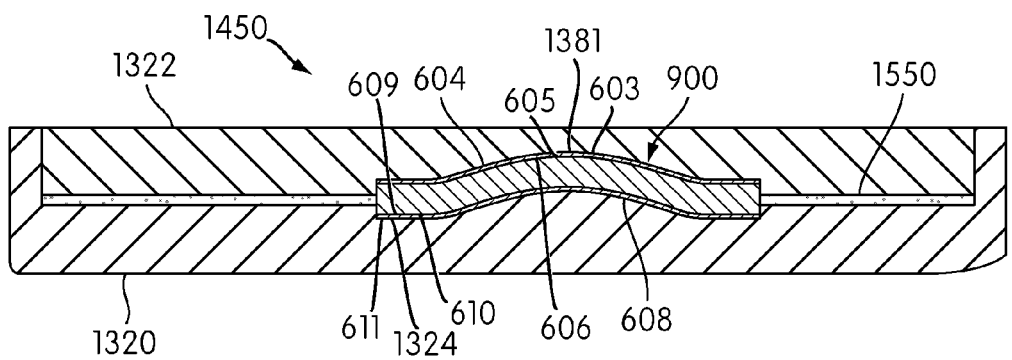
FIG. 15 is a cross sectional view of a preferred embodiment of an assembled sole.

FIGS. 14-15 are a preferred embodiment of assembled sole 1450 that comprises outer member 1320, midsole 1322 and composite plate 900. In this embodiment, outer member 1320 may be configured to contact a ground surface. Additionally, midsole 1322 may be disposed adjacent to a bottom portion of an upper.

In some embodiments, composite plate 900 may be sandwiched between midsole 1322 and outer member 1320. In this embodiment, composite plate 900 may be attached to midsole 1322 via first adhesive film 604. In particular, first side 605 of first adhesive film 604 may be associated with top portion 606 of composite plate 900, while second side 603 of first adhesive film 604 may be associated with lower portion 1381 of midsole 1322. Likewise, composite plate 900 may be attached to outer member 1320 via second adhesive film 608. In particular, first side 609 of second adhesive film 608 may be associated with bottom portion 610 of composite plate 900, while second side 611 of second adhesive film 608 may be associated with inner portion 1324 of outer member 1320. Furthermore, in some embodiments, midsole 1322 may be further bonded directly to outer member 1320 via adhesive layer 1550.

Preferably, an outer member may include provisions to increase the aesthetic appeal of an article of footwear. In some embodiments, the outer member may be translucent. In some cases, the inner portion of the outer member may be painted or otherwise decorated with designs that are visible on the outer portion of the outer member. In other cases, the midsole may be painted or otherwise decorated, and portions of these designs may be visible through the outer member. This arrangement may help prevent the designs from degrading, which may occur if the designs are applied to an outer portion of the outer member.

Figures 16, 17:
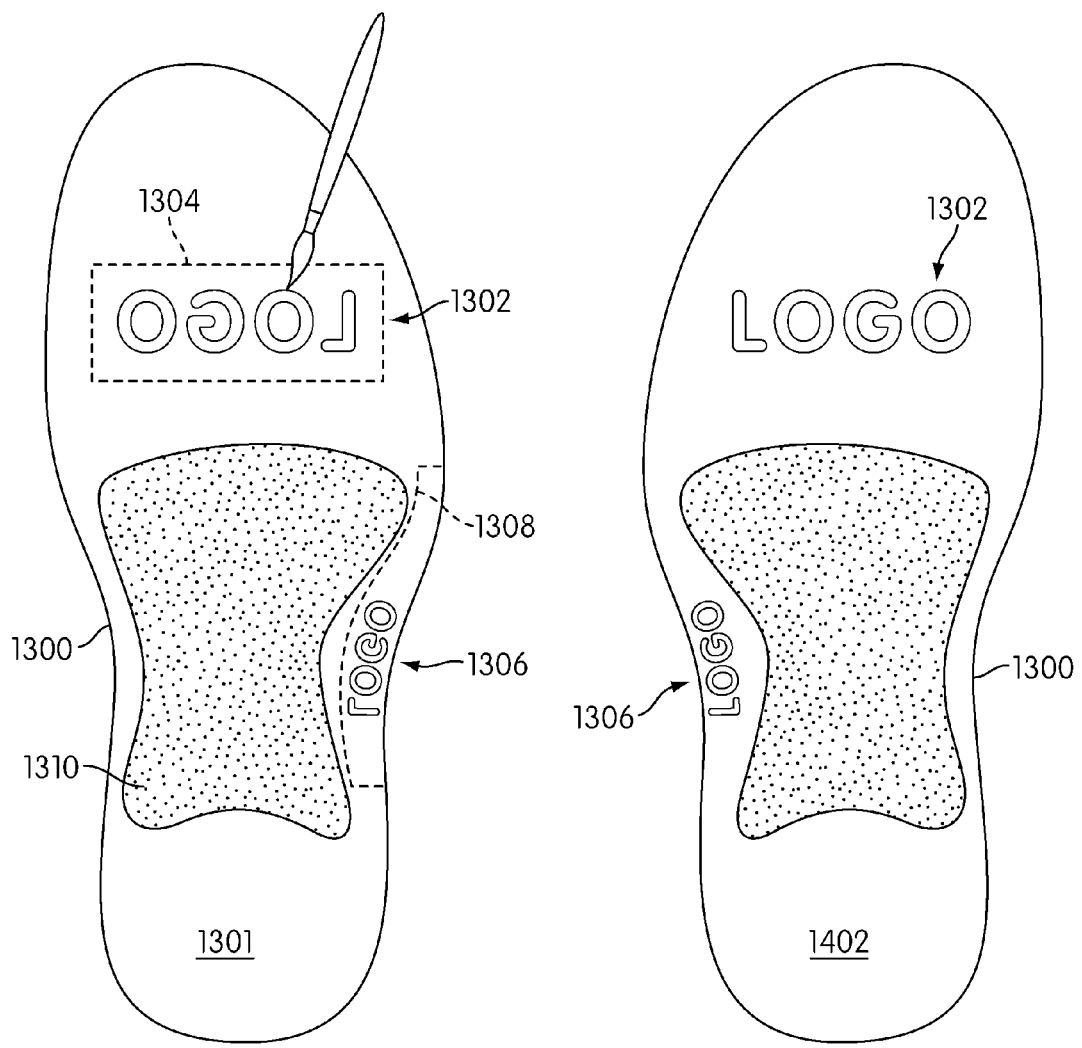
FIG. 16 is a schematic view of a preferred embodiment of multiple indicia applied to an inner portion of an outer member.
FIG. 17 is a schematic view of a preferred embodiment of multiple indicia visible through an outer portion of an outer member.

FIG. 16 is a top down view of a generic embodiment of inner portion 1301 of outer member 1300. Inner portion 1301 is configured to engage a midsole or an insole and is the portion of outer member 1300 disclosed closest to a foot during use of the associated article of footwear. In this embodiment, outer member 1300 includes composite plate 1310. Generally, composite plate 1310 is optional and may not be included in other embodiments.

Outer member 1300 may be made of a translucent or generally transparent material. In some embodiments, a logo or other design may be applied to inner portion 1301 of outer member 1300. In this embodiment, first indicia 1302 has been applied to forefoot region 1304 of inner portion 1301. Additionally, in this embodiment, second indicia 1306 has been applied to outer peripheral region 1308 of inner portion 1301. In some cases, indicia 1302 and 1306 may be applied to inner portion 1301 using paint. In other cases, indicia 1302 and 1306 may be applied to inner portion 1301 using other methods of imprinting, including markers, stamps, etching or other kinds of methods. Generally, any method of applying an indicia may be used.

In this preferred embodiment, indicia 1302 and 1306 are logos. However, in other embodiments, any kind of indicia may be used. Examples of different types of indicia that may be used include, but are not limited to shapes, names, numbers, abstract designs, images as well as other types of indicia. Furthermore, while indicia 1302 and 1306 are disposed on forefoot region 1304 and peripheral region 1308, in other embodiments various kinds of indicia could be applied to any region of inner portion 1301.

Referring to FIG. 17, indicia 1302 and 1306 are preferably visible through outer portion 1402 of outer member 1300. Using this preferred configuration, indicia 1302 and 1306 may be visible along the bottom of an article of footwear. However, because indicia 1302 and 1306 are disposed on inner portion 1301 rather than outer portion 1402, indicia 1302 and 1306 may be protected from peeling or being rubbed off during contact with the ground. In other words, indicia 1302 and 1306 may be protected by outer member 1300.

In some embodiments, an outer member may include raised side walls that are also transparent. In these embodiments, indicia of some kind could be displayed on the side wall. This arrangement would allow the indicia to remain visible after a treaded layer has been applied to the bottom of the outer member.

Figure 18:
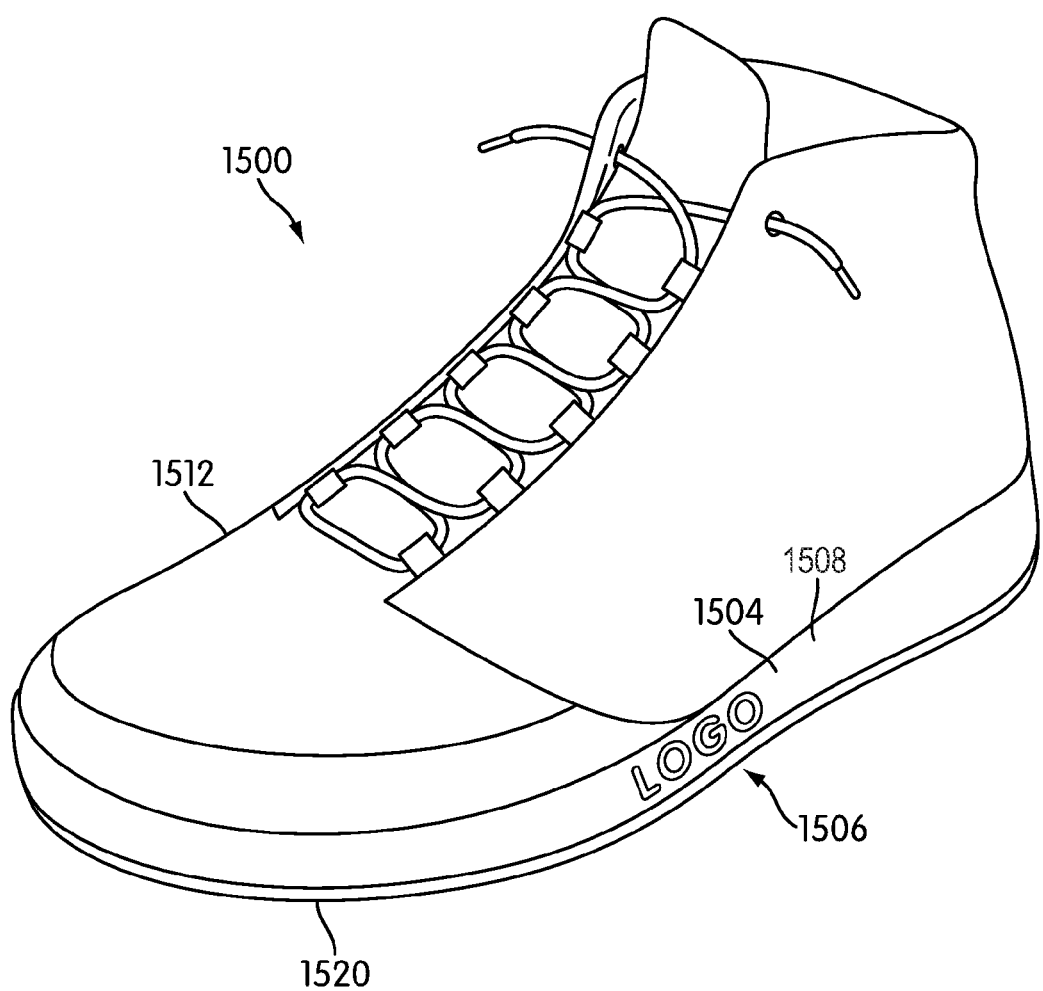
FIG. 18 is a schematic side view of a preferred embodiment of an assembled article of footwear.

FIG. 18 is an assembled side view of a preferred embodiment of article of footwear 1500. In this embodiment, article of footwear 1500 includes upper 1512, outer member 1508 and treaded layer 1520. Article of footwear 1500 may also include a midsole that is disposed between outer member 1508 and upper 1512. In some cases, side wall portion 1504 of outer member 1508 may be exposed above treaded layer 1520 and below upper 1512.

In this embodiment, third indicia 1506 is visible at side wall portion 1504. In some cases, third indicia 1506 may be applied to the inner portion (see FIG. 16) of outer member 1508 at side wall portion 1504 using paint or another technique such as those that were discussed with respect to FIG. 16. In other cases, third indicia 1506 may be applied to a side of a midsole, which is disposed behind side wall portion 1504.

In the current embodiment, third indicia 1506 is a logo. In other embodiments, third indicia 1506 could be any design, including the types of designs discussed in the previous embodiment. Furthermore, while third indicia 1506 is disposed on side wall portion 1504 in the current embodiment, in other embodiments, third indicia 1506 could be disposed on any visible portion of outer member 1508.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. An article of footwear, comprising:
   a sole including an outer member, a composite plate, and a midsole;
   wherein the composite plate comprises pre-peg woven sheets of carbon fibers;
   wherein the composite plate is more rigid than the outer member;
   a first adhesive film disposed between the outer member and the composite plate including a first side and a second side;
   wherein the first side of the first adhesive film is fixedly attached to a bottom portion of the composite plate and wherein the second side of the first adhesive film is fixedly attached to an inner portion of the outer member;
   wherein the first side of the first adhesive film is continuously pressure- and heat-bonded to the composite plate across an entirety of the bottom portion of the composite plate;
   wherein the second side of the first adhesive film is continuously bonded to the inner portion of the outer member;
   wherein the composite plate and the first adhesive film cover a first portion of the inner portion of the outer member, leaving a remaining second portion of the inner portion of the outer member, and wherein a second adhesive different from the first adhesive film is disposed on the remaining second portion of the inner portion of the outer member;
   wherein the composite plate is disposed between the midsole and the outer member;
   wherein the article of footwear further comprises a second adhesive film disposed between the midsole and the composite plate including a first side and a second side;
   wherein the first side of the second adhesive film is fixedly attached to a top portion of the composite plate and wherein the second side of the second adhesive film is fixedly attached to a first inner portion of the midsole, leaving a remaining second inner portion of the midsole;

wherein the first side of the second adhesive film is continuously pressure- and heat-bonded to the composite plate across an entirety of the top portion of the composite plate;
wherein the second side of the second adhesive film is continuously bonded to the first inner portion of the midsole;
wherein the remaining second inner portion of the midsole is attached to the remaining second portion of the inner portion of the outer member by the second adhesive; and
wherein the second adhesive film is made of a material different from the second adhesive.

2. The article of footwear according to claim 1, wherein the composite plate has an outer perimeter, and wherein the outer perimeter is located entirely within an arch portion of the article of footwear.

3. The article of footwear according to claim 2, wherein the composite plate has a contoured shape having a shape of the arch portion of the article of footwear by having a first flat portion, an arched second portion, and a third flat portion.

4. The article of footwear according to claim 1, wherein the outer member defines a recess shaped and configured to receive a portion of the composite plate protruding below the remaining second inner portion of the midsole, and wherein the first adhesive film is discontinuous with the second adhesive.

5. The article of footwear according to claim 1, wherein an indicia is disposed on the inner portion of the outer member and wherein the indicia is visible through an outer portion of the outer member.

6. The article of footwear according to claim 5, wherein the indicia comprises at least one of a logo, a shape, a name, a number, an abstract design, and an image.

7. The article of footwear according to claim 5, wherein the indicia is visible along a bottom outer portion of the outer member that is configured to contact ground.

8. The article of footwear according to claim 1, wherein the first portion of the inner portion of the outer member comprises an arch region of the outer member and the remaining second portion of the inner portion of the outer member comprises a forefoot region and a heel region of the outer member.

9. The article of footwear according to claim 1, wherein the first adhesive film is discontinuous with the second adhesive.

10. The article of footwear according to claim 1, wherein the midsole defines a recess shaped and is configured to receive a portion of the composite plate protruding above the remaining second portion of the inner portion of the outer member, and wherein the second adhesive film is discontinuous with the second adhesive.

11. The article of footwear according to claim 1, wherein each of the first adhesive film and the second adhesive film comprises a double sided acrylic adhesive film.

12. The article of footwear according to claim 1, wherein the second side of the first adhesive film and the inner portion of the outer member are continuously bonded by a cooled and hardened injection molded bond.

13. The article of footwear according to claim 1, wherein the first adhesive film and the second adhesive film are disposed on horizontal planes different from a horizontal plane on which the second adhesive is disposed.

14. An article of footwear, comprising:
an outer member;
a midsole;
a composite plate disposed between the outer member and the midsole;
wherein the composite plate comprises a composite sheet, a first side of a first adhesive film bonded to a first side of the composite sheet, and a first side of a second adhesive film bonded to a second side of the composite sheet;
wherein a first portion of an upper surface of the outer member is attached to a second side of the first adhesive film of the composite plate, leaving a remaining second portion of the upper surface of the outer member;
wherein a first portion of a lower surface of the midsole is attached to a second side of the second adhesive film, leaving a remaining second portion of the lower surface of the midsole;
wherein the remaining second portion of the upper surface of the outer member is attached to the remaining second portion of the lower surface of the midsole by a midsole-to-outer-member adhesive that is made of a material different from the first adhesive film and the second adhesive film;
wherein the composite plate and the first adhesive film cover the first portion of the upper surface of the outer member, leaving the remaining second portion of the upper surface of the outer member;
wherein the first side of the second adhesive film is fixedly attached to a top portion of the composite plate and wherein the second side of the second adhesive film is fixedly attached to the first portion of the lower surface of the midsole, leaving the remaining second portion of the lower surface of the midsole;
wherein the first side of the second adhesive film is continuously bonded to the composite plate across an entirety of the top portion of the composite plate;
wherein the second side of the second adhesive film is continuously bonded to the first portion of the lower surface of the midsole; and
wherein the remaining second portion of the lower surface of the midsole is attached to the remaining second portion of the upper surface of the outer member by the midsole-to-outer-member adhesive.

15. The article of footwear according to claim 14, wherein the composite plate has a protruding portion protruding above the remaining second portion of the upper surface of the outer member;
wherein the first portion of the lower surface of the midsole comprises a recess having a size and shape corresponding to a size and shape of the protruding portion of the composite plate;
wherein the protruding portion of the composite plate is disposed inside the recess; and
wherein the midsole-to-outer-member adhesive is discontinuous with the first adhesive film and the second adhesive film.

16. The article of footwear according to claim 14, wherein the composite plate has a contoured shape having the shape of an arch portion of the article of footwear by having a first flat portion, an arched second portion, and a third flat portion.

17. The article of footwear according to claim 14, wherein the composite plate comprises pre-peg woven sheets of carbon fibers;
wherein the composite plate is more rigid than the outer member;
wherein the composite plate is structurally rigid in at least one direction of the article of footwear;
wherein the composite plate has a width that is less than a width of the outer member; and
wherein the composite plate has a length that is less than a length of an arch region of the article of footwear.

18. The article of footwear according to claim 14, wherein the outer member provides an outermost ground contacting surface of the article of footwear and includes at least one hole outside of the first portion of the upper surface of the outer member;
   wherein a third portion of the lower surface of the midsole comprises a raised portion; and
   wherein the raised third portion of the lower surface of the midsole is disposed inside the at least one hole.

19. The article of footwear according to claim 18, wherein the raised third portion of the lower surface of the midsole extends through the at least one hole such that the raised third portion extends below the outermost ground contacting surface of the outer member to provide shock resistance.

20. The article of footwear according to claim 14, wherein the outer member, the composite plate, and the midsole comprise a sole of the article of footwear;
   wherein the sole includes a first region and a second region;
   wherein in the first region a total height of the sole is a sum of the thicknesses of the outer member, the composite plate including the composite sheet and the first and second adhesive films, and the midsole;
   wherein the second region surrounds the first region; and
   wherein in the second region a total height of the sole is a sum of the thicknesses of the outer member, the midsole-to-outer-member adhesive, and the midsole.

21. The article of footwear according to claim 14, wherein the outer member further comprises a transparent raised side wall, and wherein an indicia is visible through the transparent raised side wall.

22. The article of footwear according to claim 21, wherein the indicia is applied to an inner portion of the transparent raised side wall of the outer member.

23. The article of footwear according to claim 21, wherein the indicia is applied to a side portion of the midsole of the sole, and wherein the side portion of the midsole is disposed behind the transparent raised side wall of the outer member.

24. The article of footwear according to claim 14, wherein the midsole defines a recess shaped and configured to receive a portion of the composite plate protruding above the remaining second portion of the upper surface of the outer member, and wherein the second adhesive film is discontinuous with the midsole-to-outer-member adhesive.

25. The article of footwear according to claim 14, wherein each of the first adhesive film and the second adhesive film comprises a double sided acrylic adhesive film.

26. The article of footwear according to claim 14, wherein the first adhesive film and the second adhesive film are disposed on horizontal planes different from a horizontal plane on which the midsole-to-outer-member adhesive is disposed.

27. A sole for an article of footwear, comprising:
   an outer member;
   a composite plate; and
   a midsole;
   wherein the composite plate is more rigid than the outer member, has a width that is less than a width of the outer member, and has a length that is less than a length of an arch region of the sole;
   wherein the composite plate comprises a composite sheet, a first side of a first adhesive film bonded to a first side of the composite sheet, a first side of a second adhesive film bonded to a second side of the composite sheet, and, before assembly of the sole, a protective layer on a second side of the second adhesive film opposite to the composite sheet;
   wherein the composite sheet comprises stacked layers of thermoplastic urethane and pre-preg woven sheets of carbon fibers;
   wherein the first adhesive film is bonded to an entirety of the first side of the composite sheet;
   wherein a first portion of an upper surface of the outer member is attached to a second side of the first adhesive film opposite to the composite sheet, leaving a remaining second portion of the upper surface of the outer member;
   wherein a midsole-to-outer-member adhesive is disposed on the remaining second portion of the upper surface of the outer member;
   wherein the midsole-to-outer-member adhesive is made of a material different from the first adhesive film and the second adhesive film;
   wherein the composite plate and the first adhesive film cover the first portion of the upper surface of the outer member, leaving the remaining second portion of the upper surface of the outer member;
   wherein when the sole is assembled:
      the composite plate is disposed between the midsole and the outer member;
      the second side of the second adhesive film, with the protective layer removed, is fixedly attached to a first inner portion of the midsole, leaving a remaining second inner portion of the midsole;
      the first side of the second adhesive film is continuously bonded to the composite plate across an entirety of the second side of the composite plate;
      the second side of the second adhesive film is continuously bonded to the first inner portion of the midsole; and
      the remaining second inner portion of the midsole is attached to the remaining second portion of the upper surface of the outer member by the midsole-to-outer-member adhesive.

\* \* \* \* \*